US010453335B2

(12) United States Patent
Holleczek et al.

(10) Patent No.: US 10,453,335 B2
(45) Date of Patent: Oct. 22, 2019

(54) TRAFFIC PREDICTION AND REAL TIME ANALYSIS SYSTEM

(71) Applicant: Dataspark Pte, Ltd., Singapore (SG)

(72) Inventors: Thomas Martin Holleczek, Singapore (SG); Yunye Jin, Singapore (SG); The Anh Dang, Singapore (SG); Deepak Jayakumaran, Singapore (SG); Amy Xuemei Shi-Nash, Singapore (SG)

(73) Assignee: DataSpark, Pte. Ltd., Singapore (SG)

( * ) Notice: Subject to any disclaimer, the term of this patent is extended or adjusted under 35 U.S.C. 154(b) by 0 days.

(21) Appl. No.: 15/547,021

(22) PCT Filed: Jul. 14, 2015

(86) PCT No.: PCT/IB2015/055338
§ 371 (c)(1),
(2) Date: Jul. 27, 2017

(87) PCT Pub. No.: WO2016/203298
PCT Pub. Date: Dec. 22, 2016

(65) Prior Publication Data
US 2018/0122228 A1  May 3, 2018

(30) Foreign Application Priority Data

Jul. 14, 2015 (WO) .................... IB2015055338

(51) Int. Cl.
*G08G 1/01* (2006.01)
*G06N 5/04* (2006.01)
(Continued)

(52) U.S. Cl.
CPC .......... *G08G 1/0129* (2013.01); *G06F 9/547* (2013.01); *G06N 5/04* (2013.01); *G08G 1/012* (2013.01);
(Continued)

(58) Field of Classification Search
CPC .......... G06F 9/547; G06N 5/04; G08G 1/012; G08G 1/0129; G08G 1/0141; H04W 4/021; H04W 4/029
See application file for complete search history.

(56) References Cited

U.S. PATENT DOCUMENTS 7,221,287 B2 *  5/2007  Gueziec ............... H04W 4/029
                                                        340/905
8,868,340 B1 * 10/2014  Rinckes ............... G01C 21/3492
                                                        180/168
(Continued)

*Primary Examiner* — Rachid Bendidi
(74) *Attorney, Agent, or Firm* — Krajec Patent Offices, LLC; Russell S. Krajec

(57) ABSTRACT

A traffic routing and analysis system uses data from individual cellular or mobile devices to determine traffic density within a transportation network, such as subways, busses, roads, pedestrian walkways, or other networks. The system may use historical data derived from monitoring people's travel patterns, and may compare historical data to real time or near real time data to detect abnormalities. The system may be used for policy analysis, predicted commute times and route selection based on traffic patterns, as well as broadcast statistics that may be displayed to commuters. The system may be accessed through an application programming interface (API) for various applications, which may include applications that run on mobile devices, desktop or cloud based computers, or other devices.

18 Claims, 6 Drawing Sheets

(51) Int. Cl.
*H04W 4/029* (2018.01)
*G06F 9/54* (2006.01)
*H04W 4/021* (2018.01)

(52) U.S. Cl.
CPC .......... *G08G 1/0141* (2013.01); *H04W 4/021* (2013.01); *H04W 4/029* (2018.02)

(56) References Cited

U.S. PATENT DOCUMENTS

| | | | |
|---|---|---|---|
| 2004/0030670 A1* | 2/2004 | Barton | G01C 21/32 |
| 2007/0208497 A1* | 9/2007 | Downs | G08G 1/0104 |
| | | | 701/117 |
| 2011/0310733 A1* | 12/2011 | Tzamaloukas | G01C 21/3691 |
| | | | 370/230 |
| 2012/0221231 A1* | 8/2012 | Nagata | G08G 1/012 |
| | | | 701/118 |
| 2013/0066548 A1* | 3/2013 | Gruen | G01C 21/3617 |
| | | | 701/410 |
| 2013/0085659 A1* | 4/2013 | Bekaert | G01C 21/26 |
| | | | 701/118 |
| 2014/0012498 A1* | 1/2014 | Gustafson | G01C 21/3423 |
| | | | 701/468 |
| 2014/0244149 A1* | 8/2014 | Relyea | G08G 1/0104 |
| | | | 701/118 |

\* cited by examiner

400 — METHOD FOR ANALYZING TRAFFIC DENSITY

TRAFFIC PREDICTION AND REAL TIME ANALYSIS SYSTEM

CROSS REFERENCE TO RELATED APPLICATIONS

This application claims priority to and benefit of U.S. patent application Ser. No. 14/741,009 entitled "Traffic Predication and Real Time Analysis System" filed 16 Jun. 2015. Patent Cooperation Treaty Patent Application serial number PCT/IB2015/055338 entitled "Traffic Predication and Real Time Analysis System" filed 14 Jul. 2015, the entire contents of which are hereby expressly incorporated by reference for all they teach and disclose.

BACKGROUND

Getting through our daily commute can be frustrating at times. Overcrowded trains, long waits for busses, and road congestion add countless minutes to a commute, which reduces a country's productivity not only by wasting worker's time during the commute, but with the extra added stress of the commute.

Managing of a transportation network is difficult because of the lack of data. The transportation may be a subway or train system, a bus system, a roadway system, or other network, and the current data gathering and analysis of ridership or users is antiquated at best. Because of the lack of data, it is difficult for transportation managers to determine where to make changes, from gross changes such as where to upgrade the system or minute changes such as adding extra seconds to a boarding procedure for a subway train.

SUMMARY

A traffic routing and analysis system uses data from individual cellular or mobile devices to determine traffic density within a transportation network, such as subways, busses, roads, pedestrian walkways, or other networks. The system may use historical data derived from monitoring people's travel patterns, and may compare historical data to real time or near real time data to detect abnormalities. The system may be used for policy analysis, predicted commute times and route selection based on traffic patterns, as well as broadcast statistics that may be displayed to commuters. The system may be accessed through an application programming interface (API) for various applications, which may include applications that run on mobile devices, desktop or cloud based computers, or other devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
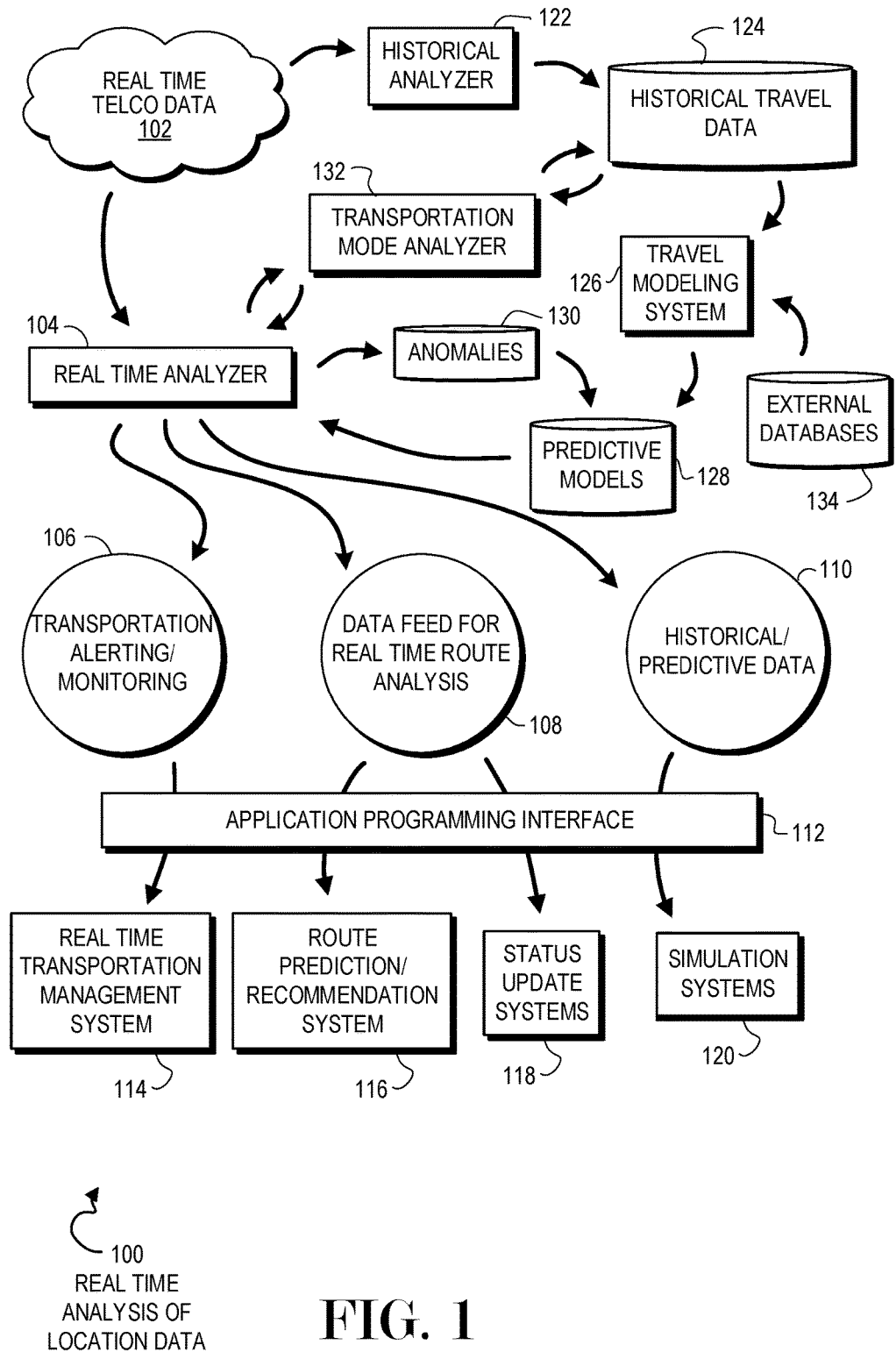
FIG. 1 is a diagram illustration of an embodiment showing a system for analyzing location data and user movement in a transportation network.

Traffic Prediction and Real Time Analysis System

A traffic routing and analysis system uses data from individual cellular or mobile devices to determine traffic density within a transportation network, such as subways, busses, roads, pedestrian walkways, or other networks. The system may use historical data derived from monitoring people's travel patterns, and may compare historical data to real time or near real time data to detect abnormalities. The system may be used for policy analysis, predicted commute times and route selection based on traffic patterns, as well as broadcast statistics that may be displayed to commuters. The system may be accessed through an application programming interface (API) for various applications, which may include applications that run on mobile devices, desktop or cloud based computers, or other devices.

A traffic routing and analysis system may use location data obtained from traveler's mobile devices to determine travel patterns. These data may be obtained from telecommunications network's operational monitoring data, as well as other sources. The data may trace the location of individual users across a transportation network, which may include walking or traveling in a vehicle, which may be a bicycle, car, bus, train, ferry, airplane, or other mode of transportation. The data may include locations and timestamps for the locations, and these data may be assembled into routes that specific people have or are travelling.

Historical data may be used to generate predictive models of people's movement. The predictive models may reflect the actual measured movement of the people derived over thousands if not millions of trips within the transportation network. The models may include a rich dataset of affinities, relationships between travelers, as well as the traveler's movement history.

The models may include demographic information of travelers, and in some cases may include estimates of traveler's affinity for various items, which may include hobbies, products and brands, epicurean interests, or any other item. The models may be derived from relationships between an individual traveler and other travelers, stores and locations frequented by the traveler, as well as interests or affinity that may be derived from other data sources, such as a traveler's use of a mobile device, website browsing history, and other sources.

Predictive analysis using the models may include policy simulations and changes to the network. For example, a policy simulation may predict the traffic loads when more or fewer subway trains are dispatched on a specific route, or the ridership changes that may occur when a new bus line is added. The policy simulation may also predict the traffic patterns that may occur when a large employer, such as a manufacturing plant, adjusts their shift start and end times.

In such an analysis, a behavioral model of travelers may be used to identify effects of policy changes from a baseline condition to a changed condition. The behavior models may attempt to simulate the traveler's behavior in the changed condition, which may be when a new bus line is simulated or when a retail store closes at an earlier hour, for example.

The predictive features of a model may be used to detect anomalies or problems when real time or near real time data may be available. The anomalies may indicate that changes may be made to the operation of a network. Real time or near real time traffic analysis may be compared to predicted traffic levels for a given time period. An anomaly may occur, for example, when a traffic accident on a highway may cause a delay for busses or cars. This anomaly may be detected by comparing expected traffic patterns to actual traffic patterns, and a system may alert network operators of the anomaly or take some other action, such as dispatch emergency equipment.

In some systems, such as a subway system, a transportation operator may be able to adjust the availability of resources to cope with changes in the observed traffic patterns. For example, a system may detect a large bolus of people heading towards and entering a subway station. The subway operator may be able to increase the frequency of trains to the subway station, speed up or slow down trains heading to the station, permit longer stops at the station to allow more passengers to board, or make other changes to the normally scheduled service.

The predictive features may be used by an individual commuter using a mobile device application or other software interface that may predict the traveler's commute, for example. When the transportation network may be operating as predicted, the traveler's commute may be estimated using predicted travel times. When an anomaly may be detected using real time data, the system may predict an increased travel time and may suggest alternative routings for the traveler.

When personally identifiable information (PII) is collected and/or processed in the various databases and use scenarios (including those described below), users will be (a) requested to give consent and/or (b) given an opportunity to opt in or opt out of such data processing, whichever is applicable in compliance with applicable data protection laws. In many embodiments, PII will usually be properly obfuscated prior to being aggregated into a graph representation with other data sources. Various other mechanisms or measures may be used to ensure that PII is not collected, stored, transmitted, analyzed or otherwise processed in any manner not in compliance with applicable data protection laws.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration showing an example embodiment 100 illustrating several components that may be used in a real time analysis system of location data.

Embodiment 100 illustrates one example of how location data derived from a telecommunications network may be processed for use in various transportation related scenarios. The location data may be derived from cellular telephones or other mobile devices that may be carried by users, and that location data may be constructed into predictive models of people's movements.

A real time analyzer 104 may analyze real time location data 102 from a telecommunications network to generate alerting or monitoring data 106, data feeds for real time route analysis 108, as well as historical or predictive data 110.

The alerting or monitoring data 106 may be used, for example, by a real time transportation management system 114, which may monitor the activity within a transportation network, such as a subway system, bus system, or other vehicle traffic system. In some systems, an operator may be able to make adjustments to the transportation network in response to a problem or change to the traffic in the system. For example, a subway operator may be able to dispatch additional trains or make adjustments to the travel time, station dwell time, or other parameters in response to an increase or decrease in riders.

The alerting or monitoring data 106 may be used in several different scenarios along the lines of day to day management of a transportation system. Alerts may indicate that there are problems within the infrastructure, such as faulty equipment or accidents that may be detected by an unusual backup or congestion in the system. Alerts may also be generated when an unusual event occurs, such as the aftermath of a sporting event when a large number of riders attempt to board a subway system all at once.

A real time transportation and management system 114 may use a real time analyzer 104 and various predictive models 128 to analyze and predict the effects of changes to the transportation system. These changes may be modeled when determining a response to an alert, thereby combining both the alerting mechanism and a predictive analysis mechanism. For example, an alert may indicate that a larger than normal number of people are commuting during a peak load time. One option for a subway operator may be to increase the frequency of trains along a subway line, which may address a short term congestion problem. The operator may also dispatch an extra train or two along the line, which may take a longer time to implement and see the effects.

Before the operator may implement a given option, a simulation may be performed using various predictive models 128 to determine a predicted result of the various options. The options may be analyzed to determine, for example, that slightly increasing the speeds of the existing trains between stations for a short period of time may address a momentary congestion issue at one subway station, whereas adding another train into service may take too long to have any effect on the momentary bolus of commuters.

A data feed for real time route analysis 108 may be produced by the real time analyzer 104. Such a data feed may be real time or near-real time, and may provide data for a route prediction or recommendation system 116, as well as status update systems 118.

A route prediction or recommendation system 116 may receive data that may include the density of users, wait times, or other indicators of traffic congestion along a transportation network. The recommendation system 116 may determine routing paths for a user who wishes to go from one location to another, and may suggest a route that avoids congestion or time delays. Such systems may account for user preferences as well, such as avoiding densely packed subways or busses and routing along less dense alternatives, even when the alternative route may take somewhat longer.

A status update system 118 may be any type of notification system that may tell users information about a transportation network. In one implementation, such a system may be signage that may update with travel times, wait times, traffic density indicators, or other information about segments along a traffic corridor. In another implementation, a density map may be displayed that shows wait times, user density, or other information for a series of routes. In some cases, such a map may be displayed on a user's device and may show the user's intended route overlaid with density information, which may give the user a sense of the delays the user may experience on their trip.

Historical and predictive data 110 may be used for various simulation systems 120 to analyze effects of changes by simulating the changes. For example, a simulation system 120 may be used to evaluate large changes to an infrastructure system, such as adding or removing a subway station, adding a new highway to a road system, changing from one type of bus to another, or other larger changes. In other examples, a simulation system 120 may evaluate changes such as increasing or decreasing the amount of time a bus may be stopped at a bus stop, changes due to increasing the number of turnstiles at a particular subway station, changes by increasing the amount of time doors are open during loading, or other seemingly smaller changes.

The real time analyzer 104 may have an application programming interface 112 through which various applications may interact with the analyzed and processed telecommunications data 102. The applications programming interface 112 may represent one architecture whereby telecommunications data may be made available to various data consumers. Such an architecture may be a computer or network service that may be made available over the Internet or other network, and in many cases, may be a subscription or other paid service that may specialize in providing data in manners that can be consumed by one or more consumer applications. The consumer applications may be provided through a third party in some cases, while in other cases, some of the consumer applications may be provided by the same organization or company that may process the telecommunications data 102.

The data provided over the applications programming interface 112 may be anonymized or obfuscated. In some cases, the real time analyzer 104 may process some or all of the telecommunications data 102 when that data includes personally identifiable information. In other cases, the real time analyzer 104 may process the telecommunications data 102 that may have been stripped or obfuscated of such personally identifiable information. After analysis by the real time analyzer 104, the data provide across the application programming interface 112 may have been summarized or processed to the point where any personally identifiable information may have been removed from the data.

The telecommunications data 102 may include real time locations for various users within a telecommunications network. In a typical example, the location information may be based on sensors in a hand held or mobile device, such as Global Positioning System (GPS) or other location sensors. Such information may be transmitted to a telecommunications network operator on a periodic basis. In another example, a telecommunications network operator may be able to detect users connected to a particular cell tower or may be able to triangulate the position of individual users.

A historical analyzer 122 may gather and analyze the telecommunications data 102 to generate a database of historical travel data 124. The historical travel data 124 may include travel paths for individual users or groups of users.

The historical travel data 124 may be summarized travel data that may represent groups of users, which may be organized by various demographic parameters, travel paths, travel segments, travel origins, travel destinations, travel mode, or other parameters. In such summarized data, personally identifiable information may have been obfuscated or scrubbed from the data.

The historical travel data 124 may include travel paths for specific individuals. In some such embodiments, the travel paths may identify an individual user, and the user may have given permission prior to such data to be collected and analyzed.

A travel modeling system 126 may generate predictive models 128 of travel based on the historical travel data 124. In some cases, external databases 134 may be consulted to generate rich profiles of the various users. The external databases 134 may include social network connections, demographic information databases, public property records, or other data sources that may be added.

The predictive models 128 may predict the behavior across a transportation network based on the historical travel data 124. In many cases, the predictive models 128 may further be able to predict effects or changes to a transportation network. In such a use case, the predictive models 128 may receive a change to the transportation network and may be able to predict the behavior of the transportation network or the users who may use such a network.

The predictive models 128 may include various models that may describe how a transportation network may operate. For example, a model of a subway system may include representations of the train stations, the travel distance and times between stations, and the various connections between train lines. The model may further include time models of arriving at a station, passengers entering and exiting the train cars, and departure of the train from the station. Such models may include many other parameters as well.

The predictive models 128 may use historical data to simulate future behaviors. For example, a time model of a train entering a station, discharging and adding passengers, and leaving the station may be based on historical observations from the historical travel data 124. Such a time model may be affected by different parameters, such as the density of people on a train platform, frequency of trains arriving at a station, weather, or other factors. Such factors may be derived from analysis of historical travel data 124.

The predictive models 128 may assess effects from anomalies 130 that may be observed by a real time analyzer 104. The anomalies 130 may be observed or predicted changes to the transportation network, and the predictive models 128 may predict the effects of the anomalies 130. In many cases, the predictive models 128 may also receive corrections, improvements, or predicted corrections to the transportation network, and may predict the effects of such corrections on the network.

In an example, the real time analyzer 104 may identify a traffic jam caused by an accident on a highway, which may generate an anomaly 130. In response, a traffic operator may wish to change the timing of stop lights on side streets near the traffic jam, as the predictive model 128 may predict that a certain percentage of users may attempt to detour around the accident. The predictive models 128 may simulate the traffic loading with and without the proposed changes to determine whether the changes of traffic light timings would have a positive effect.

A transportation mode analyzer 132 may attempt to determine the mode of transportation for individual users. The mode of transportation may be, for example, walking, riding a bicycle, riding a car or taxi, riding a bus or boat, riding a train, flying in an airplane, or mode of transportation.

The transportation mode analyzer 132 may determine a likely mode of transportation from several mechanisms. In one mechanism, a rules engine or heuristic may examine the speed of movement, the relative velocity to other users, mapping to known transportation networks, or other information to infer a user's mode of transportation. Another mechanism may infer a mode of transportation by assessing external data, such as usage of a subway or bus card, ownership of an automobile, or previous travel mode determinations made for that user.

The transportation mode analyzer 132 may generate anomalies 130 when individuals change a mode of transportation. For example, a user who may normally commute via train may decide to travel via taxi. Such an abnormality may indicate that the user has a reason for changing their transportation habits, and may result in an alert or change in information being transmitted to a personal route prediction service, which may be an application on the user's hand held mobile device.

Figure 2:
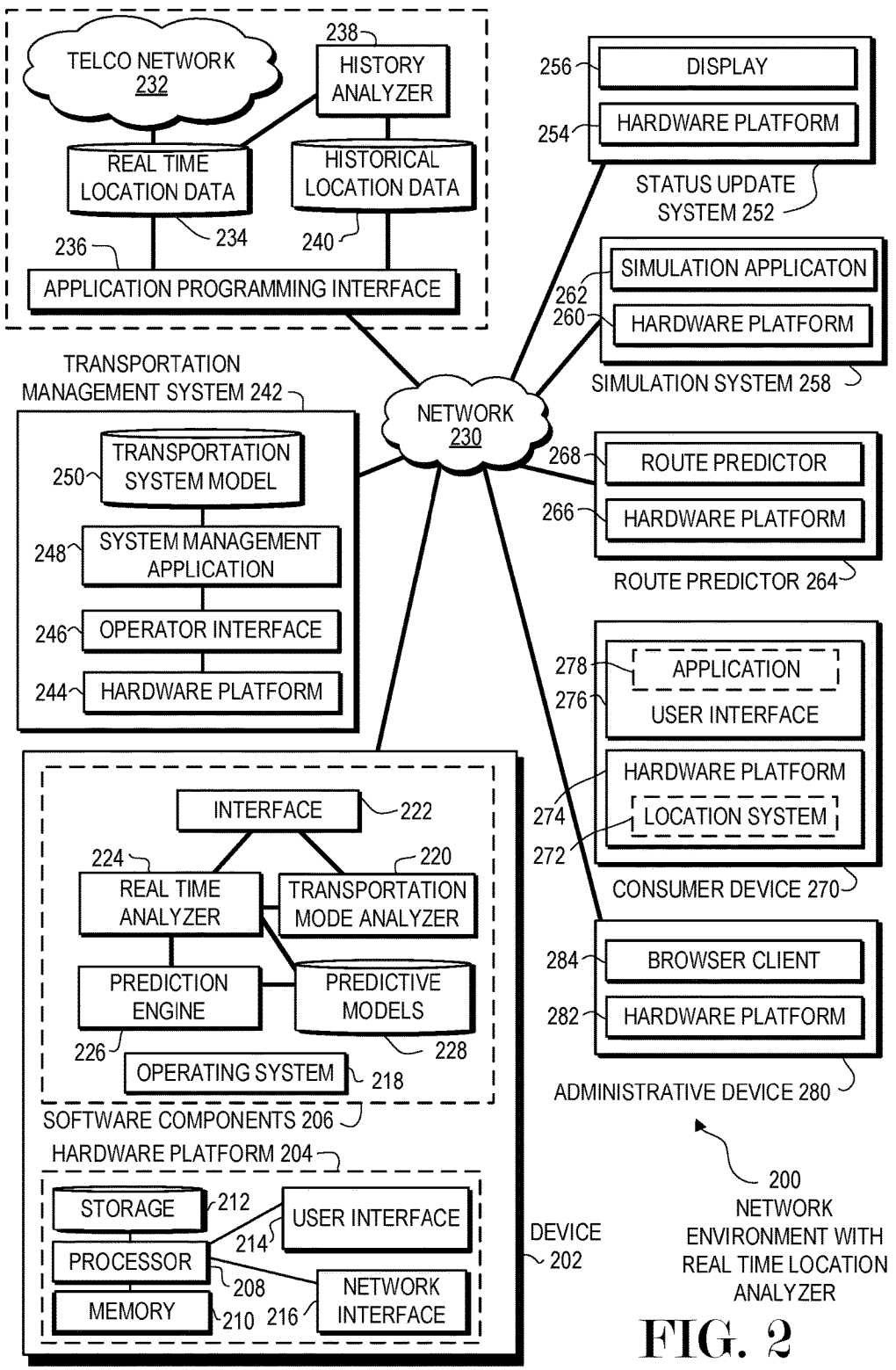
FIG. 2 is a diagram illustration of an embodiment showing a network environment with services used to analyze user movement within a transportation network.

FIG. 2 is a diagram of an embodiment 200 showing components that may use real time location information in various scenarios. The components are illustrated as being on different hardware platforms as merely one example topology.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A real time analyzer 224 may perform real time analysis of location data, which may be consumed by other applications through an application programming interface 222. The interface 222 may communicate with various other data consumers through various communications protocols, including push notifications, pull requests, or other communication techniques. The interface 222 may be a programmatic interface through which other applications may request and obtain processed location data.

The real time analyzer 224 may receive real time or near-real time location data from a telecommunications network 232 and may provide alerting and real time traffic density information, predicted traffic, simulation results, and other information. In many cases, the output of a real time analyzer 224 may be tailored for a specific application, such as providing subway-related travel information to a subway management system or for providing traffic notification services for a person commuting by automobile.

A transportation mode analyzer 220 may estimate a user's mode of transportation by analyzing location data associated with the user. In some embodiments, such a service may be provided by a telecommunications network, while in other embodiments, the service may be provided by the same service as the real time analyzer 224.

A prediction engine 226 may develop and operate various predictive models 228 of user movements. In some cases, the predictive models may be developed for individual users, and such models may predict a user's location based at least in part by past behavior as well as recent movements. In other cases, the predictive models may be developed for groups of users, such as users who share demographic similarities, users who travel similar paths or have similar origins or destinations, or other points of demarcation.

The predictive models 228 may be developed for specific transportation networks. For example, a public subway or bus system may have predictive models that may estimate the ridership at various times in the system. Some such models may estimate the density of people at subway stations or bus stops, as well as the density of people on board trains or busses.

In many systems, the telecommunications data may represent a fraction of the users of a transportation network. For example, a single telecommunications provider may have data from its subscribers, which may be a fraction of the total users of a transportation network. In such a case, the actual or predicted ridership may be determined by multiplying the measured number of individuals by a factor representing that telecommunication network's market percentage to give an estimate of actual number of people at a given location.

A telecommunications network 232 may provide real time location data 234 for some or all of its subscribers. Such data may be available through an application programming interface 236. When the data include personally identifiable information, a user may have given permission prior to data collection, retention, and transmittal for access to their location data.

The real time location data 234 may be summarized data for specific locations, such as the number of observed users at a specific subway station, the number of users observed on a subway train, or other summarized data. In some cases, the location data may have supplemental demographic information, and for example may include a demographic profile of users observed on a train traveling from one station to the next, as well as the demographic profile of the users alighting and boarding the train at each station.

The notion of "real time" may include data that is near-real time. In many cases, location data may have delays from milliseconds, to seconds, to minutes, to hours, but such data may be considered "real time" in various use scenarios. Some delay between location observations and the various processing steps may be inevitable in many systems, however, such delays are often tolerable depending on the use cases. In some use cases, such as traffic light timing adjustments or subway train speed adjustments, may use data with delays up to a small number of minutes while still yielding a useful result. In some such cases, having real time data with delays in the milliseconds or seconds may be more responsive. In a scenario where traffic delays may be transmitted to a driver of a car, delays of several minutes or even tens of minutes may be acceptable. For the purposes of this specification and claims, the term "real time" may include delays of several milliseconds, seconds, or minutes.

A history analyzer 238 may generate historical location data 240. The historical location data 240 may come in several forms, including aggregated data for specific locations or travel paths, as well as individual travel paths taken by specific users. The historical location data 240 may be accessed through an application programming interface 236.

A transportation management system 242 may be a system that manages subways, trains, bus systems, ferries, airplanes, taxis, roadways, or other transportation systems. In some cases, the transportation management system 242 may provide purely monitoring operations, where an operator may be able to observe performance of the system. In some cases, the transportation management system 242 may be able to provide control operations, where an operator may be able to cause changes to the system in real time or near real time in response to anomalies or other events.

The transportation management system 242 may operate on a hardware platform 244 and may contain an operator interface 246. An operator may be able to monitor and control a system management application 248, which may display statuses, send commands throughout the system, cause changes to the system, as well as other functions. In many such systems, a transportation system model 250 may provide a mathematical or other model of the transportation system. Such a model may be used to display the system, such as displaying the density of users of the system. Such a model may be used to predict performance aspects of the system in some cases.

The transportation management system 242 may be a data consumer of the real time analyzer 224 and the prediction engine 226. In such an architecture, the system management application 248 may access location data and may provide query instructions through the interface 222.

A status update system 252 may be a system that displays status of a transportation network. In one type status update system, a hardware platform 254 may have a display 256. Such a display may be an automatically updated public status display. An example may show the estimated travel time to specific destinations, the wait time at a location, the density of people on an arriving train, or other metrics. In some cases, the status update system 252 may be a handheld device, such as a user's mobile telephone, on which an application may display the current delay or status of the user's normal commute path. Such a system may communicate with the real time analyzer 224 through the interface 222.

A simulation system 258 may have a hardware platform 260 and a simulation application 262. The simulation application 262 may create various scenarios on which the predictive models 228 may be run. In such a system, the scenarios may have a model of a transportation network and may inject changes to the behavior of the network or changes to the behavior of the users of the network. The simulation application 262 may compute a simulation to predict the effects on the transportation network. The simulation application may access the prediction engine 226 through the interface 222.

A route predictor 264 may be a system that may suggest a route through a transportation network based on user preferences and other parameters. One version of such a system may be found at a ticketing kiosk of a public transportation network. A user may select a destination, and such a system may select a preferred or recommended route through the network. In many cases, the recommended route may take into account the traffic density or other factors when making the suggestion. The system may operate on a hardware platform 266 and may have a route predictor 268, which may be an application that may query the real time analyzer 224 through the interface 222.

A consumer device 270 may be used to collect location information about a consumer, and in some cases may also be a mechanism to deliver results of location analysis. The consumer device 270 may have a hardware platform 272, which may have a location system 274. The hardware platform 274 may be, for example, a cellular or mobile telephone, tablet, personal computer, wearable device, or some other device that the consumer may typically carry or have with them. The location system 272 may be a Global Positioning System (GPS) receiver or some other location detection device.

The consumer device 270 may not have a location system 272 in some cases. In such cases, the location of the consumer device 270 may be detected using techniques such as triangulation, proximity to a beacon, or some other mechanism.

A user interface 276 may be present on the consumer device 270 through which an application 278 may be surfaced. The application 278 may display traffic density information, predicted or recommended travel routes, or other information concerning the user's travel plans.

An administrative device 280 may be one mechanism by which an administrator may interact with the real time analyzer 224, prediction engine 226, or other components on the device 202. The administrative device 280 may have a hardware platform 282 on which a browser client 284 may run. The browser client 284 may communicate with the device 202 and display web pages, for example, through which an administrative user can manage the device 202.

Figure 3:
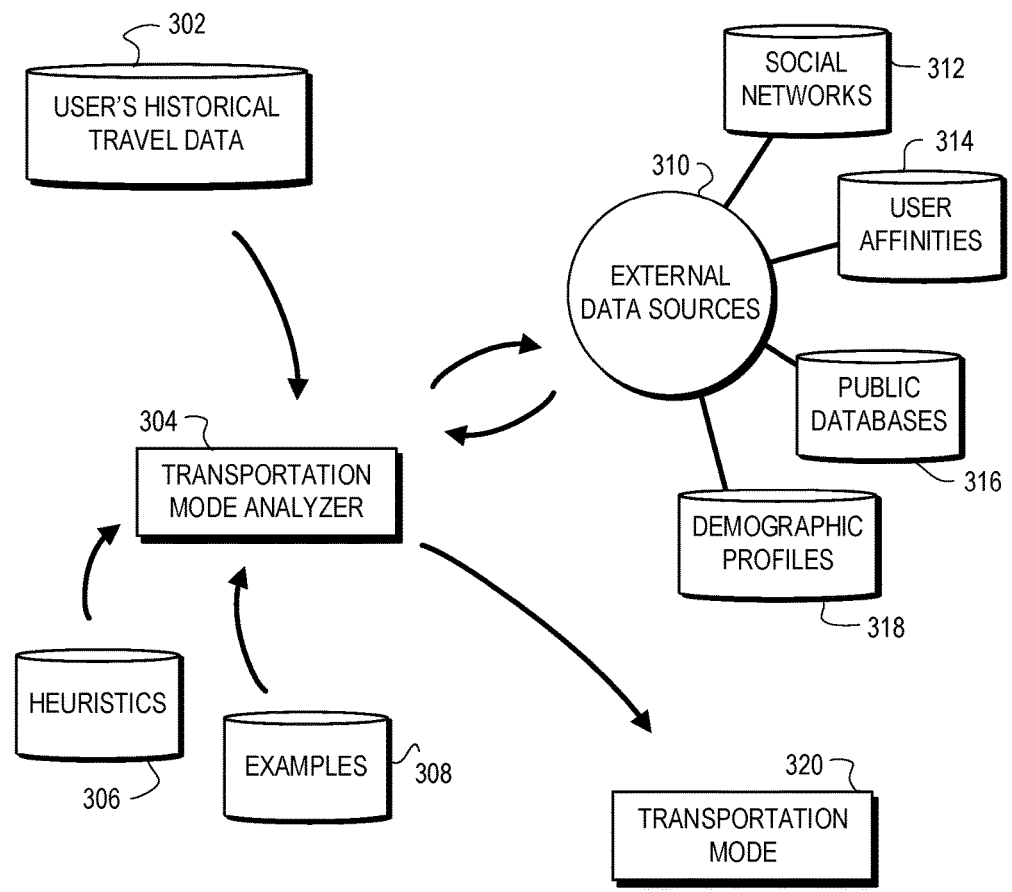
FIG. 3 is a diagram illustration of an embodiment showing various components of a transportation mode analyzer.

FIG. 3 is a diagram illustration of an embodiment 300 showing components that may interact when inferring a transportation mode from location information.

A transportation mode may be inferred from a user's historical travel data. Such data may be a sequence of locations with timestamps. The speed of travel may be calculated by determining the distance and time between successive location data points. Further, information about the locations may be inferred from comparing location coordinates to a database that may include a transportation network.

A transportation mode analyzer 304 may determine whether a user is walking, riding a bicycle, traveling by car or taxi, riding a bus, traveling by train, sea, or air. A transportation mode determination may be a step in selecting data for analyzing a transportation network. In a typical use case, a large amount of location data may be collected from a telecommunications network, and such a data may be screened or filtered by identifying the data that relates to a transportation network of interest. For example, when studying a public transportation network such as a subway system, a transportation mode analyzer 304 may identify movement segments that correspond with the subway system for analysis.

The output of the transportation mode analyzer 304 may be a transportation mode 320. In many cases, a user's travel path may be broken into movement segments, and each of the movement segments may have a different mode of transportation.

A movement segment may be a portion of a user's movement for which a characterization may be made. For example, a person's morning commute may involve walking to a bus stop, riding a bus to a transportation hub, walking to a train platform, riding a train to a station, and walking from the station to an office building. Individual movement segments may be defined for each different mode of transportation.

A transportation mode may be inferred using various heuristics 306 or by comparing a movement segment to various examples 308. An example set of heuristics may identify a pedestrian by a person who may be traveling without exceeding a walking or running speed. A person who may exceed a walking or running speed may be riding a bicycle when the person does not exceed a typical bicycle speed.

A set of examples 308 may include movement segments for which a previous mode determination has been made. For example, a set of train rides from station to station may be manually annotated by a user. For each annotated portion of the train ride, a sequence of locations with corresponding timestamps may be selected and used as an example sequence.

The transportation mode analyzer 304 may compare known or annotated movement sequences to a user's location sequence to identify similar portions of the user's location sequence. When a match is made, the movement segment may be identified and stored.

In some cases, a transportation mode analyzer 310 may use external data sources 310 to supplement an analysis. For example, various public databases 316 may be used to increase confidence in a mode determination. The public databases 316 may include a location database that may identify locations from which transportation modes may be inferred. Such locations may be bus stops, train stations, airports, ferry landings, bike paths, pedestrian walkways, roadways, train beds, parking lots, or other locations.

The public databases 316 may include public record databases, such as automobile registration information, voter registration information, licensing information, real property ownership information, or other sources of data. Such information may be used to develop a demographic profile about a particular user as well as correlate assumptions about the user's travel habits.

Social networks 312 may be publically available sources of information that may connect a user with other users. In some cases, the connections may indicate similarities in demographics, habits, travel patterns, or other information that, when correlated, may infer travel behavior. Similarly, user affinities 314 and demographic profiles 318 may add to a demographic profile of a user.

Figure 4:
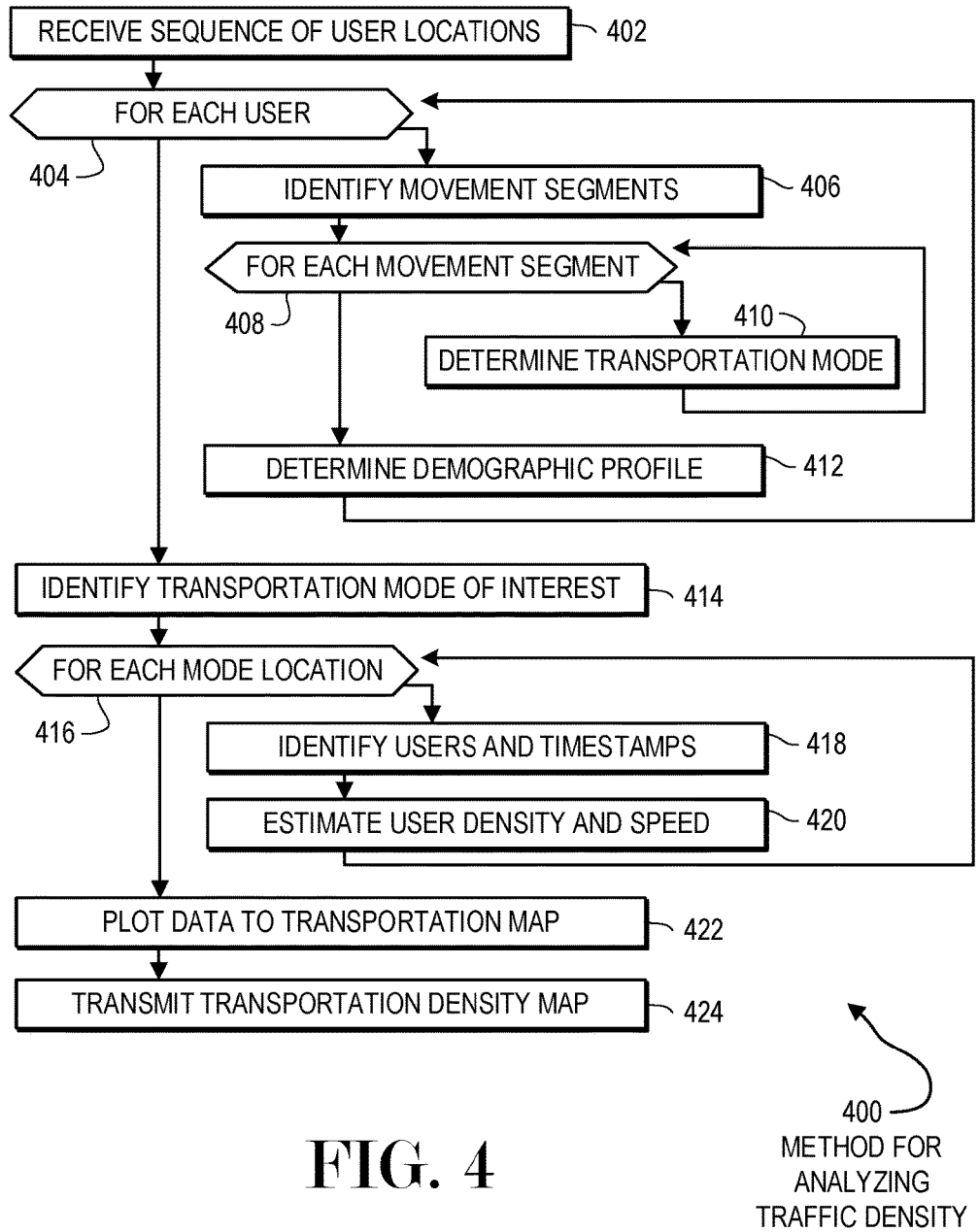
FIG. 4 is a flowchart illustration of an embodiment showing a method for analyzing traffic density.

FIG. 4 is a flowchart illustration of an embodiment 400 showing a method of analyzing traffic density. Embodiment 400 is a method that may be performed to generate real time density measurements that may reflect the density of users or traffic within a transportation network.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 400 illustrates a method for analyzing real time or near real time location information. The location information is analyzed to find transportation modes, then locations across the transportation network are analyzed to find the user density. The results may be plotted on a transportation map.

The results may include demographic information about the users of the transportation network. The demographic information may be available in those embodiments where individual user paths may be identified such that demographic data for those users can be gathered.

A sequence of user locations may be received in block 402. The user locations may be sequence of locations with timestamps. The location information may be presented in any manner, and typically the locations may be coordinates that may adhere to a geolocation definition standard. The timestamps may include time and date information.

In some cases, the user locations may be a raw data feed from a communications network. In such cases, the locations may include locations, timestamps, and user identifiers for all users within a communications network. In other cases, a filter may request locations of users who are moving from one location to another, which may return all location information for moving users, regardless of location. In still other cases, a request may return location information for users within specific geographic boundaries, such as users within 100 meters of a transportation network.

From the location data, sequences of movement for individual users may be identified and processed in block 404. The individual users may be identified with anonymized identifiers that may permit the analysis of a sequence of location data for an individual users without identifying the user. In some cases, a user may be identified with a personally identifiable identifier such that additional demographic information may be gathered about the specific user. Such data may be obtained after receiving permission from the user for such analysis.

For each user in block 404, the user's movement segments may be identified in block 406. The movement segments may be identified, at least initially, by analyzing the speed of a user's movements and identifying a movement segment by movement within a specific speed range. Such an analysis may determine when a user may be walking, riding in a car, or some other mode of transportation.

In some cases, beginning and ending points of movement segments may be identified by the locations visited by a user. For example, a train station may indicate a break between a walking segment and a train segment.

For each movement segment in block 408, the transportation mode may be determined in block 410. A method for determining transportation mode may be found in other embodiments within this specification.

A demographic profile of a user may be determined in block 412. In cases where the user may be identified, a search of public databases or other data sources may help in generating a demographic profile for the user.

After processing each user in block 404, a transportation mode of interest may be identified in block 414. The transportation mode of interest may reflect the transportation network for which traffic density data may be collected. In some cases, multiple modes of transportation may be selected.

For each location within the selected mode in block 416, the users and timestamps for the location may be identified in block 418. The user density and speed may be estimated in block 420.

The locations within the selected mode may be the beginning and end points of various travel paths in the transportation network. In some networks, such as a subway network, the beginning and end points of a movement segment may be well defined and consistent between users, as those points may be the various train stations. In some networks, such as automobile networks or pedestrian walking networks, the beginning and end points may vary from one user to another. In some such cases, the beginning and end points may be aggregated or summarized together.

The data may be plotted on a transportation map in block 422 and transmitted in block 424.

Figure 5:
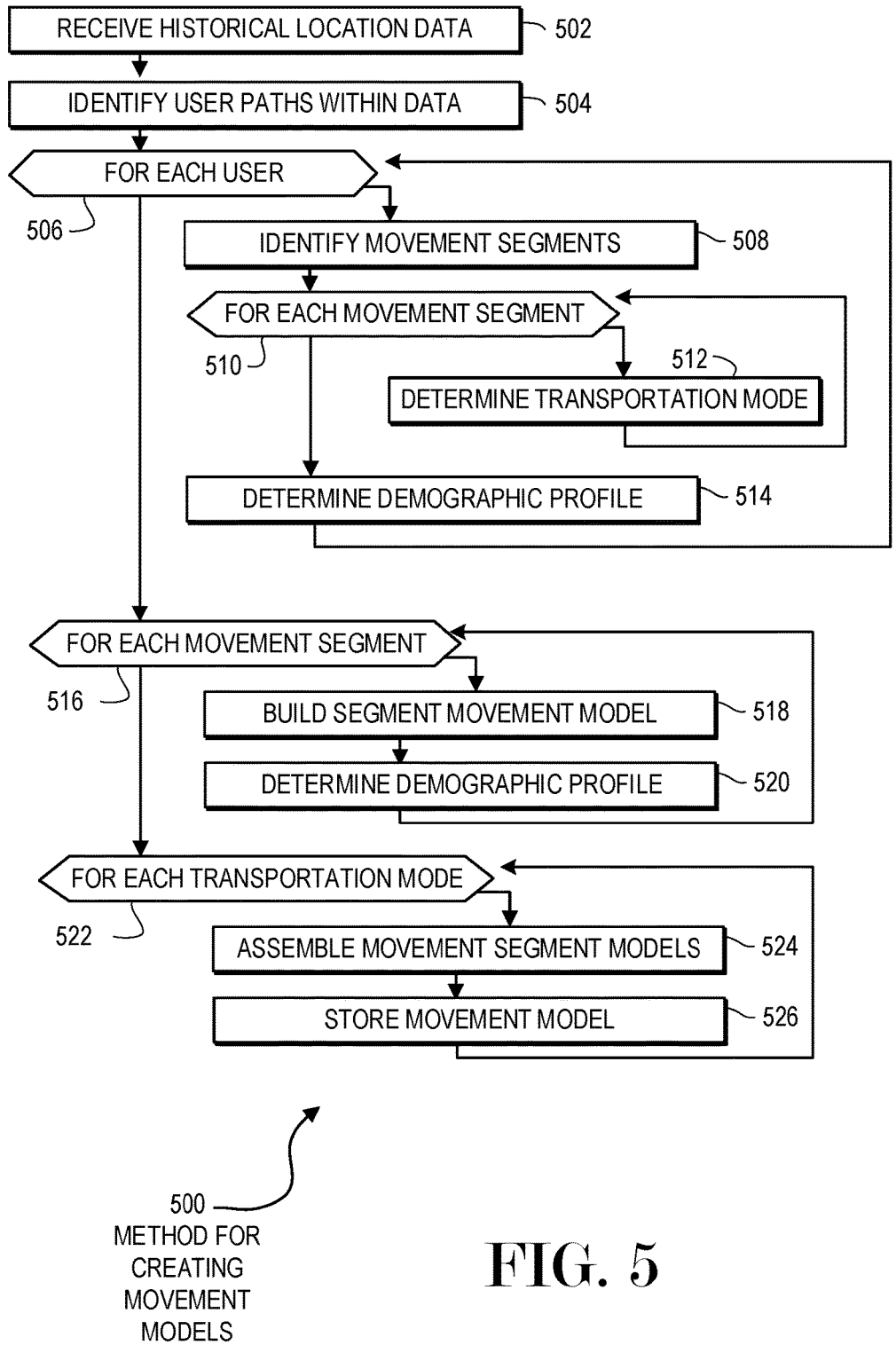
FIG. 5 is a flowchart illustration of an embodiment showing a method for creating movement prediction models.

FIG. 5 is a flowchart illustration of an embodiment 500 showing a method of creating movement models. Embodiment 500 may be one method by which a movement model may be created to predict future movement. The movement model may also attempt to define the factors that may cause changes in the predicted outcome, such as the people density.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 500 may dissect location information into movement segments, then may attempt to build predictive models of the user movements across those movement segments. In many cases, the predictive models may use demographic information as well as other outside information to identify factors that may cause changes in the user density or other predicted results of the models.

Historical location data may be received in block 502. User paths within the data may be identified in block 504.

For each user in block 506, the user's movement segments may be identified in block 508. For each movement segment in block 510, a transportation mode may be identified in block 512. A demographic profile for the user may be identified in block 514.

For each movement segment in block 516, a movement model for the segment may be constructed in block 518. A demographic profile for the users may also be determined in block 520.

The movement model may predict the movement of users on a movement segment using various input parameters. In many systems, there may be several time factors as inputs, such as time of day, day of week, holiday or non-holiday, season of year, or other time related inputs. Some models may include other extraneous or external data that may cause the output to change, such as accidents or construction along the travel path or adjacent travel paths, changes to the transportation system capacity, opening or closing of businesses in the area, sporting events in the area, or other external events.

Some movement models may include upstream or downstream events as inputs to the movement model. For example, a movement model of a segment of a train system may have consider the inputs of trains arriving and the effects of the trains or people movement on downstream stations.

The movement model may be useful as a predictive measure when inputs to the movement model are factors that may be tested against. For example, when a future analysis may be made for construction delays, changes in subway system timing, changes to traffic signal timing, or other changes, those factors may be included in the predictive model so that those effects may be accurately predicted.

For each transportation mode in block 522, the segment movement models may be assembled in block 524 and stored in block 526. The assembled segment movement models may include the movement models of each of the segments within a transportation network. In cases where there may not be enough data to adequately model a particular node or edge of a transportation network, data from nearby nodes and edges of the network may be aggregated and modeled as a single node or edge of the transportation network.

The segment movement models may include confidence intervals or variances for different conditions. The confidence intervals may indicate the statistical variance in the results. Such variance may be used to indicate an anomaly when a real time measured observation may be outside the confidence intervals of a mean value provided by a model.

Figure 6:
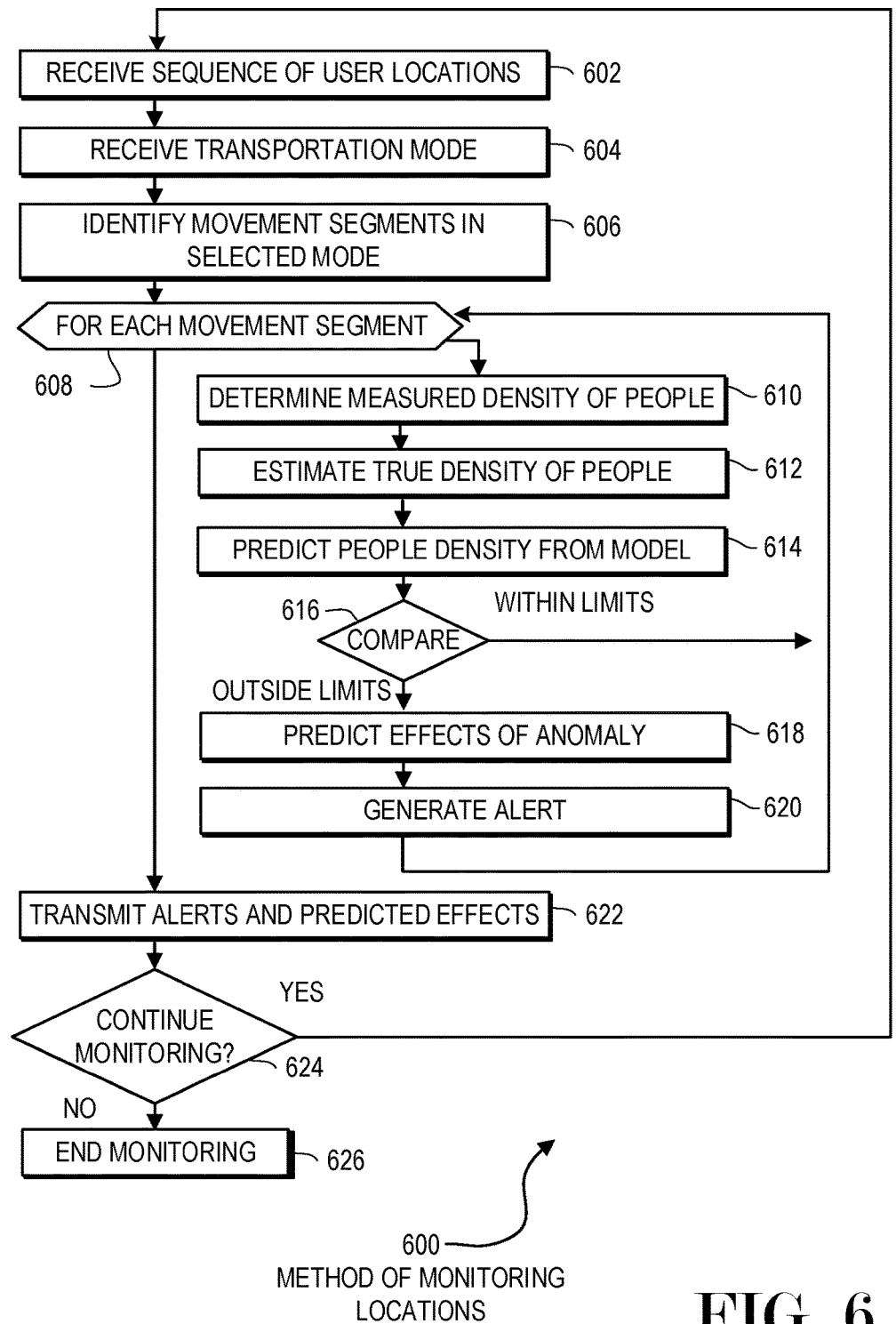
FIG. 6 is a flowchart illustration of an embodiment showing a method for monitoring a transportation network using real time location data.

FIG. 6 is a flowchart illustration of an embodiment 600 showing a method of monitoring transportation system locations using predictive modeling. Embodiment 600 is a method that may be performed to compare actual, real time data to predicted data and determine that an anomaly has occurred. The effects of the anomaly may be predicted and an alert may be generated and transmitted.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A sequence of user locations may be received in block 602. The user locations may be real time or near real time data. A transportation mode of interest may be identified in block 604 and movement segments within the transportation network may be identified in block 606.

For each movement segment in block 608, a density of people in the movement segment may be determined in block 610. The true density of people in the segment may be determined in block 612, as the measured data may reflect only a percentage of users that may be present.

A prediction of the density within the segment may be made in block 614. The prediction may use a prediction model derived from historical data.

When the real time estimation and the predicted model are within a predefined confidence limit in block 616, the process may return to evaluate another movement segment.

When the real time estimation and the predicted model value are outside a predefined confidence limit in block 616, a further prediction of the effects of an anomaly may be performed in block 618 and an alert may be generated in block 620.

The prediction of the effects of an anomaly may use the predicted model to assume the anomaly may apply to other segments in the transportation network and to predict those effects. If additional anomalies are predicted, those may be added to an alert. In some cases, a single anomaly may not cause much disruption to the transportation network, while in other cases, a single anomaly may cause a ripple effect of problems across a wide portion of the transportation network.

The alerts and predicted effects may be transmitted in block 622. If further monitoring is desired in block 624, the process may loop back to block 602 to process another set of incoming location data. If no more monitoring is desired in block 624, the process may end in block 626.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one computer processor, said method comprising:
receiving a plurality of location data points, each of said location data points being generated from a mobile device carried by individual users;
for each of said individual users, determining a mode of transportation at least in part from said location data points associated with said individual users;
determining a density of users from said plurality of location data points;
determining a predictive model of said mode of transportation based on historical record of said density of said users;
receiving a real time set of said location data points and determining a real time conditions in said mode of transportation;
determining a plurality of changes to make to said mode of transportation;
evaluating each of said plurality of changes using said predictive model and said real time conditions to determine a corresponding plurality of predictive effects of said changes, at least one of said plurality of changes comprising changing said mode of transportation from a first transportation mode to a second transportation mode;
selecting one of said plurality of changes to implement based on said predicted effects, at least one of said predicted effects being predicted commute time; and
displaying said one of said plurality of changes to implement.

2. The method of claim 1, said mode of transportation being a train system.

3. The method of claim 2, said train system being a subway system.

4. The method of claim 1, said mode of transportation being a bus system.

5. The method of claim 1, said mode of transportation being a train, and said second mode of transportation being a taxi.

6. The method of claim 1, said mode of transportation being a train, and said second mode of transportation being a bus.

7. The method of claim 1, said mode of transportation being a train, and said second mode of transportation being walking.

8. The method of claim 1, said mode of transportation being a bus, and said second mode of transportation being a train.

9. The method of claim 1, said mode of transportation being a bus, and said second mode of transportation being a taxi.

10. A system comprising:
a hardware platform comprising a programmable computer processor;
an interface comprising:
an input mechanism that receives location data points for individual users;
an output mechanism that transmits traffic density data;
a database of historical location data;
an analysis system operable on said computer processor, said analysis system performing a method comprising:
receiving a plurality of location data points, each of said location data points being generated from a mobile device carried by individual users;
for each of said individual users, determining a mode of transportation at least in part from said location data points associated with said individual users;
determining a density of users from said plurality of location data points;
determining a predictive model of said mode of transportation based on historical record of said density of said users;
receiving a real time set of said location data points and determining a real time conditions in said mode of transportation;
determining a plurality of changes to make to said mode of transportation;
evaluating each of said plurality of changes using said predictive model and said real time conditions to determine a corresponding plurality of predictive effects of said changes, at least one of said plurality of changes comprising changing said mode of transportation from a first transportation mode to a second transportation mode;
selecting one of said plurality of changes to implement based on said predicted effects being predicted commute time;
and
displaying said one of said plurality of changes to implement.

11. The system of claim 10, said mode of transportation being a train system.

12. The system of claim 11, said train system being a subway system.

13. The system of claim 10, said mode of transportation being a bus system.

14. The system of claim 10, said mode of transportation being a train, and said second mode of transportation being a taxi.

15. The system of claim 10, said mode of transportation being a train, and said second mode of transportation being a bus.

16. The system of claim 10, said mode of transportation being a train, and said second mode of transportation being walking.

17. The system of claim 10, said mode of transportation being a bus, and said second mode of transportation being a train.

18. The system of claim 10, said mode of transportation being a bus, and said second mode of transportation being a taxi.

* * * * *